Aug. 7, 1962   V. N. JARRELL   3,048,259
VINE FEEDING MACHINE
Filed Aug. 1, 1960   5 Sheets-Sheet 1

INVENTOR
*Virgil N. Jarrell*
BY
*Mason, Fenwick & Lawrence*
ATTORNEYS

Aug. 7, 1962 V. N. JARRELL 3,048,259
VINE FEEDING MACHINE
Filed Aug. 1, 1960 5 Sheets-Sheet 5

INVENTOR
*Virgil N. Jarrell*

BY *Mason, Fenwick & Lawrence*
ATTORNEYS

United States Patent Office 3,048,259
Patented Aug. 7, 1962

3,048,259
VINE FEEDING MACHINE
Virgil N. Jarrell, Viola, Del.
Filed Aug. 1, 1960, Ser. No. 46,661
12 Claims. (Cl. 198—160)

This invention relates to vine feeding machines of the type disclosed in U.S. Patent No. 2,842,255, and in particular to improvements in that machine.

Patent No. 2,842,255 discloses a machine for feeding vines, such as peas, beans, etc. to a machine for removing the peas or beans from the vines. The feeder is designed to provide a uniform feed at a predetermined rate to ensure maximum performance from the deviner. The feeder includes a pivoted feed cylinder, operable under the weight or pressure of vines being fed, to control the rate at which vines are fed to the cylinder to slow or increase the feed to the cylinder to ensure uniform delivery rate by the cylinder. The patented structure also includes a plurality of movable distributors to comb out excess vines from the mass being fed and to uniformly distribute vines over the cylinder.

The general object of the present invention is to provide a feeder of this general character which includes improved operating mechanisms.

A specific object of the present invention is the provision in a feeder of this kind of an improved feed cylinder construction, resulting in a smoother feed and less tangling of the vines in the cylinder structure.

Another object is the provision of an improved distributor assembly, allowing a longer distributor stroke and providing an improved distributor action.

A further object is to provide a feeder having improved means for controlling the flow of vines to the feeding cylinder.

Other objects of the invention will become apparent from the following description of one practical embodiment thereof when taken in conjunction with the drawings which accompany, and form part of, this specification.

In the drawings:

FIGURE 8 is an end view of a portion of the central portion of the machine frame showing the principal drive shafts.

Figure 1:
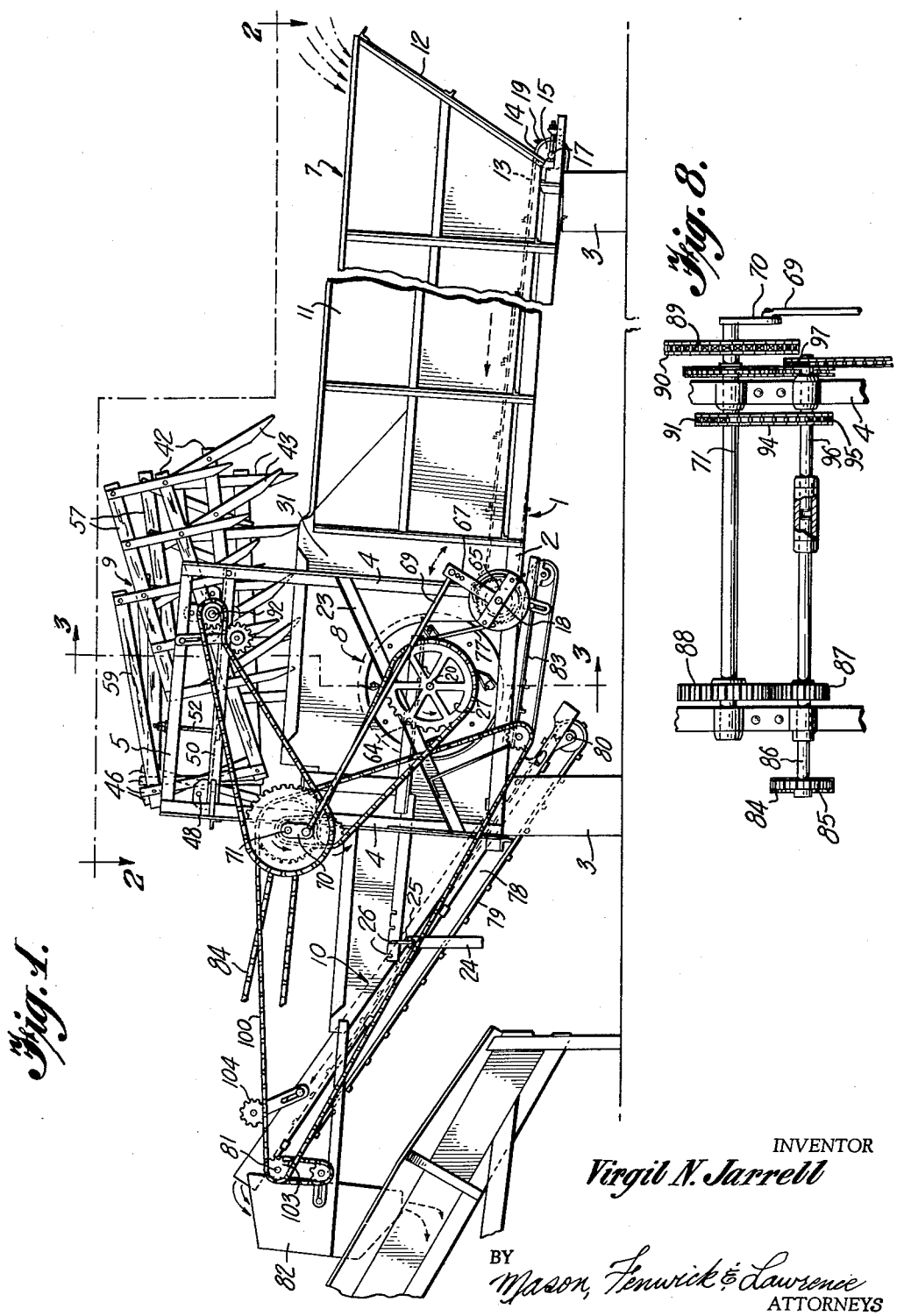
FIGURE 1 is a side elevation of the improved vine feeding machine.
Figure 2:
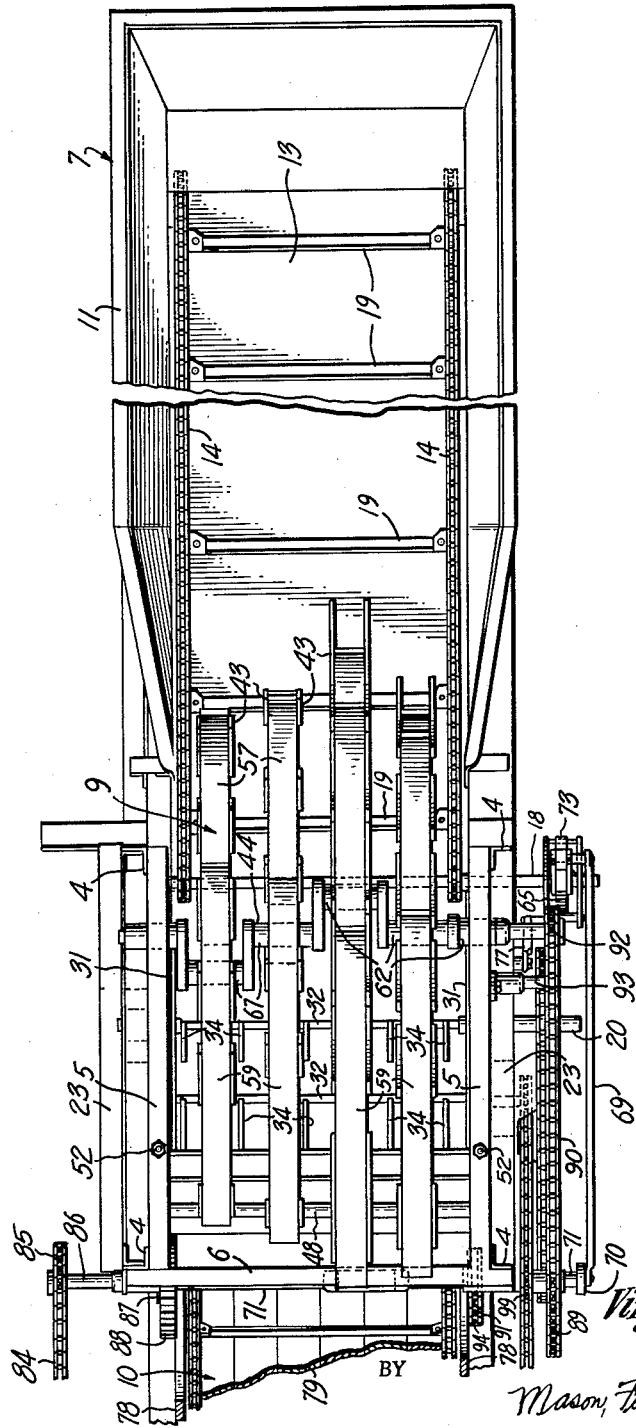
FIGURE 2 is a top plan view of the machine.
Figure 3:
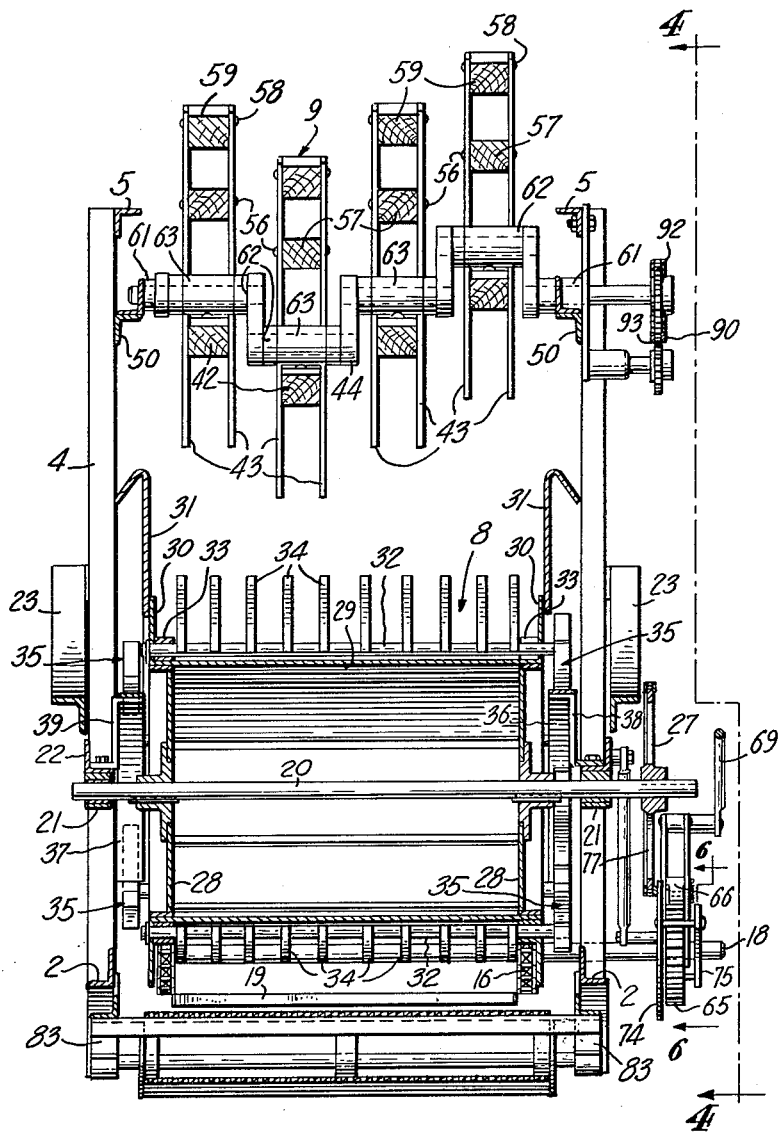
FIGURE 3 is a vertical, transverse section taken on the line 3—3 of FIGURE 1.

Referring to the drawings in detail, the feeder is built upon a frame, indicated generally at 1, which includes a base frame 2 mounted on supports 3, standards 4 fixed to the base frame at their bottoms and connected at their tops by longitudinal and transverse frame members 5 and 6. Any additional and suitable framing members may be used. Carried on the frame at the front end of the machine is a vine supply bin 7. Within the central portion of the machine, between the standards 4, a feed cylinder 8 is mounted for rotation and for bodily movement vertically. Above the cylinder is a distributor mechanism 9 for leveling off the vine mass being fed and, to an extent at least, pushing back surplus vines toward the bin. At the rear of the machine is an inclined delivery conveyor 10.

The bin 7 may take any appropriate form. As shown it consists of upwardly and outwardly flaring side walls 11, fixed to the frame rails 2, and a front wall 12. The bin is open rearwardly toward the feed cylinder. The bin bottom is formed by a floor 13, and endless chains 14, passing over sprockets 15 and 16, mounted on the shafts 17 and 18, respectively, journalled on the frame 2 have cleats 19 extending between them and lying on the floor. As the chains move rearwardly, as will be described, the cleats move vines from the bin to the feed cylinder.

The feed cylinder 8 is fixedly mounted upon a shaft 20, which is rotatably mounted in bearings 21 carried near the forward ends of lever arms 22. The lever arms, which support the cylinder, are pivotally connected to frame-bridging members 23 connected to the standards 4. The pivotal points for the lever arms 22 are but a short distance to the rear of the bearings 21, but the levers project some distance to the rear of the pivots, and weights 24 are hung from the rear ends of the levers to counter-balance the cylinder weight and give the cylinder a floating action. Weights 24 have attaching hooks, or bails, 25 to seat in selected ones of recesses 26 spaced longitudinally of the lever arms, so that the counterbalancing effect of the weights may be adjusted. Shaft 20 carries a sprocket 27 by means of which the cylinder may be rotated, as will be described.

The cylinder proper is composed of a pair of spaced heads 28 in the ends of an unbroken cylindrical sheath 29 which forms the cylinder surface. The heads have peripheral flanges 30 projecting radially beyond the surface of the cylinder. These flanges fit closely against shielding wings 31 which extend rearwardly from the bin walls 11 to confine the vine passage to the width of the cylinder and prevent spilling the vines over the sides of the cylinder and entanglement with the cylinder shaft.

Equally spaced around the cylinders there is a plurality of transversely extending finger-shafts 32, mounted in bearings 33 adjacent the flanges 30. Each shaft carries a plurality of curved fingers 34, with the fingers spaced apart along the full length of the shafts between the bearings. The fingers are adapted to assume positions wherein they project generally radially outward of the cylinder, and positions more nearly tangent to the surface of the cylinder as the several finger-shafts are rocked.

In order to control the position and movement of the fingers, each shaft has an actuating arm 35 fixed to one end. Alternate shafts project through opposite flanges 30, and the arms 35 are mounted on the projecting shaft ends. This places one-half of the actuating arms at one end of the cylinder, and one-half at the other end. Two cams 36 and 37 are mounted on each side of the cylinder upon brackets 38 and 39 carried by the lever arms 22. This fixes the position of the cams relative to the cylinder, even though the cylinder is free to float vertically during operation. Cams 36 are arcuate, and of approximately 180° extent. They are concentric to the cylinder, and lie along the forward arc of the cylindrical path. Their position is inwardly removed from the periphery of flanges 30. Cams 37 are also arcuate and concentric to the cylinder. They are of approximately 90° extent and occupy the rear lower quarter of the cylindrical path. The position of cams 37 is adjacent the rims of flanges 30 and, therefore, further removed from the axis of the cylinder than the cams 36. Actuating arms 35 are adapted to move in a circular path as the cylinder rotates which will carry them inside cams 37 and outside cams 36. Arms 35 have curved shoes 40 for contact with, and surface movement over, cams 36 to project fingers 34 outwardly into vine-engaging position as they travel upwardly and rearwardly. Arms 35 have inclined extensions 41 to engage and move over the inner faces of cams 37 to withdraw the fingers from the vines and swing them inwardly during the downward and forward cycle of movement of the fingers with the cylinder rotation.

The distributor 9 consists in a number of vertically swingable distributor bars 42, each having a number of distributor legs 43 connected to it for forward and backward swinging movement, with the movements of the bars and legs being actuated and controlled, in part at least, by a rotating crank shaft 44.

The distributor bars have their rear ends pivotally connected, as at 45, to the lower ends of rocker arms 46. The rocker arms carry bearing blocks 47 at about their mid-points for journalling on a pivot shaft 48, which is mounted in brackets 49, fixed to side rails 50 that are pivotally connected, as at 51, to the forward standards 4 of the frame. The rear ends of rails 50 are hung by adjusting bolts 52 from the longitudinal top frame members 5. The bolts have their lower ends attached to the rails, and their upper ends pass through openings in the top frame members 5. Suitable washers 53 fit over the bolt shank and seat upon the members 5, and nuts 54 are threaded on the bolt ends. By adjusting the nuts on the bolts, the pivot shaft 48 can be raised or lowered to change the position of the distributor and thereby its action on the load.

The legs 43, which are pointed at their lower ends, are pivoted intermediate their lengths to the distributor bars by pivots 55. At their upper ends the legs are pivotally connected, as at 56, to tie bars 57 so that all of the legs will swing in unison about their pivots 55 on the distributor bars. One of the legs on each bar, the center leg as shown, is longer than the others and projects above the tie bar. At its top, the longer leg is connected by pivot 58 to one end of a control member 59, which is pivotally connected at its other end, as at 60, to the top of the rocker arm 46.

Crankshaft 44 is mounted in bearings 61 on the rails 50. While the crank may have any number of throws, it is shown as having four throws 62 oriented at 90° from one another to accommodate four distributor bars. The distributor bars carry bearings 63 which connect the bars to the throws of the crank.

It will be clear from the above description that if crankshaft 44 is rotated, the distributor bars at their points of connection to the crank will move in a circle. The horizontal and vertical components of this movement will cause the distributor bars to swing vertically about their connections 45 with the rocker arms 46 and the rocker arms to oscillate about their connections to shaft 48. Of course, rocking movement of the rocker arms will cause opposite horizontal movement between the distributor bars and their respective control members 59 to result in swinging movement of the lower ends of legs 43 longitudinally of the machine.

As mentioned above, the feed cylinder 8 has a floating mount, and when excessive loads of vines are upon it the cylinder will swing about its pivots 64 and move downward. To this extent, the cylinder acts as a weighing device for vines passing through the machine. In order to deliver a constant flow of vines, it is necessary that any overload or underload at the cylinder be relieved. This is accomplished by the two-fold action of the distributors and controlling the action of the bin conveyor 14.

Figure 4:
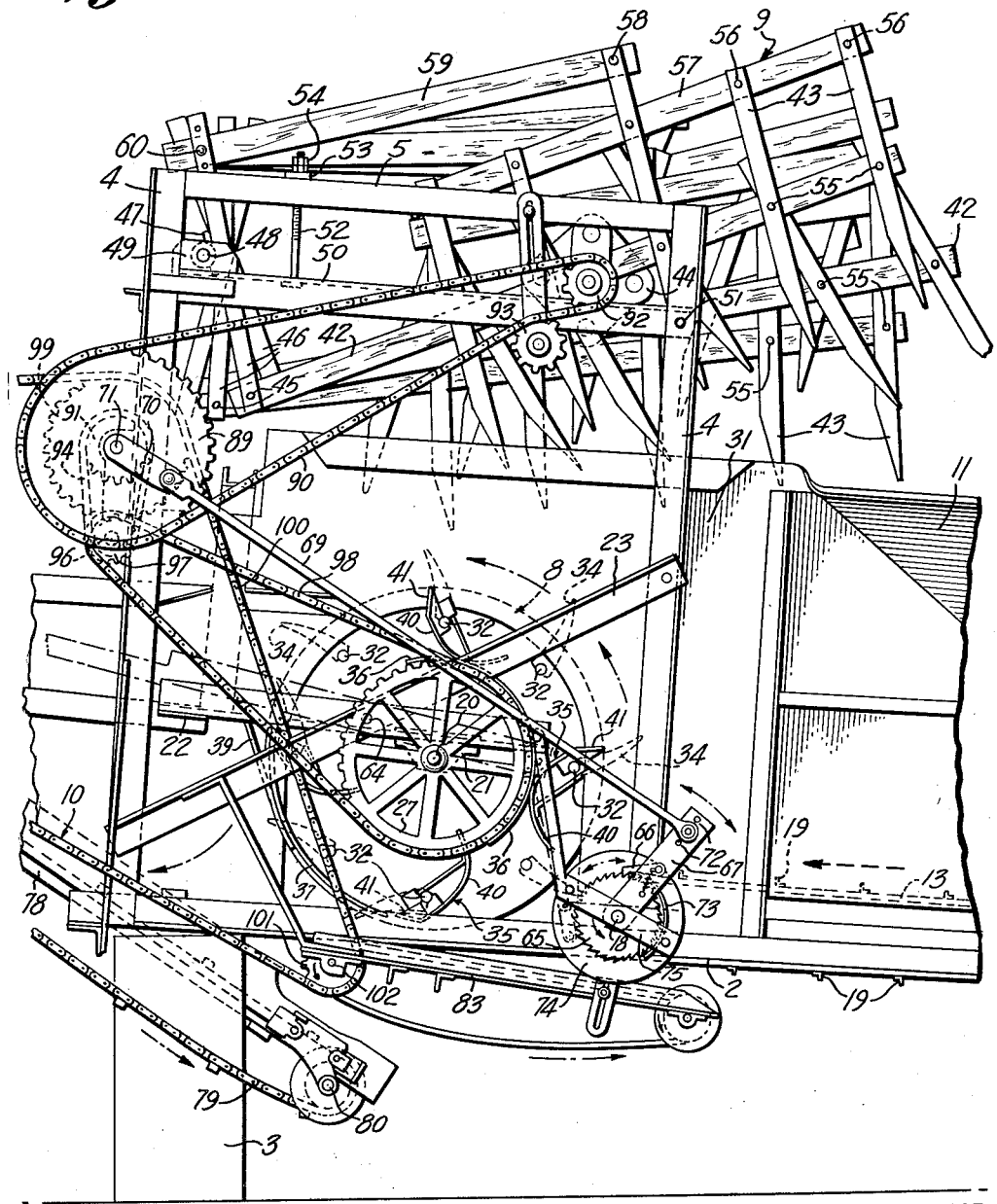
FIGURE 4 is an enlarged side elevation of the central part of the feeder, illustrating the feed cylinder, the distributor, and the cylinder feed control means.
Figure 5:
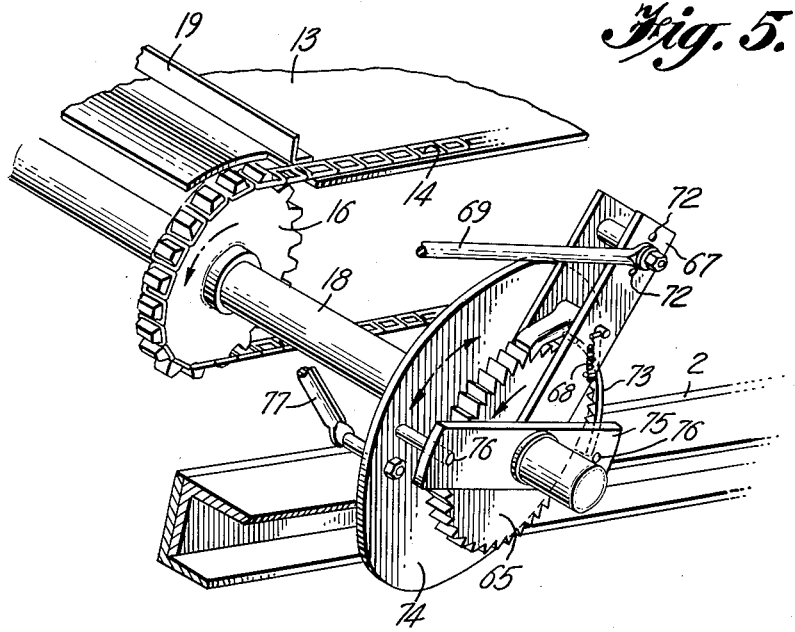
FIGURE 5 is a perspective view of the cylinder feed control mechanism.
Figure 6:
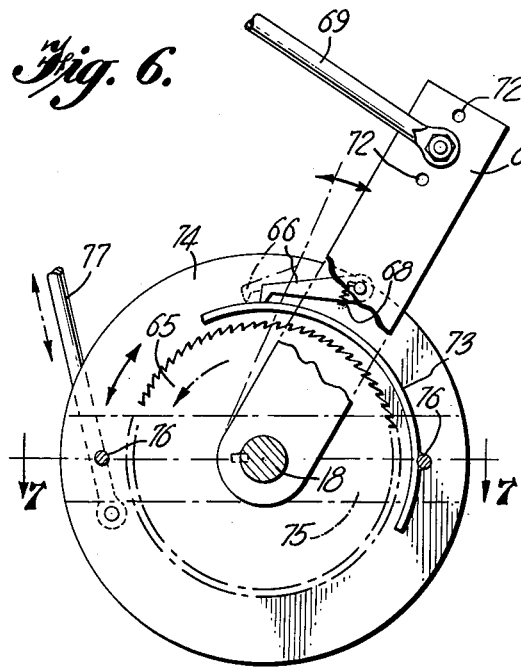
FIGURE 6 is a side elevation of the mechanism shown in FIGURE 5, parts being broken away.
Figure 7:
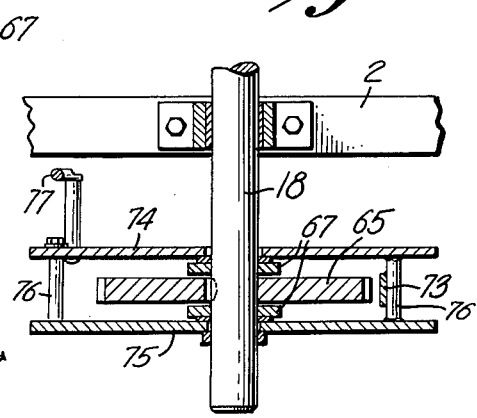
FIGURE 7 is a horizontal section taken on the line 7—7 of FIGURE 6.

The bin conveyor is driven by means of a pawl and ratchet carried on the shaft 18. The ratchet 65 is fixed to one end of shaft 18 and the pawl 66 is pivotally attached to one end of a lever 67 which is freely rockable on shaft 18. A spring 68 connected to the pawl and lever 67 urges the pawl into contact with the ratchet teeth. Lever 67 is oscillated to cause intermittent turning of shaft 18 and advance of conveyor 14 by means of a link 69 connected to the lever and a crank arm 70 carried by a shaft 71 journalled on the frame. Lever 67 has a plurality of openings 72 to which the link 69 may be connected to vary the throw of the pawl when crank 70 is rotated. In order to limit the action of the pawl in advancing the ratchet, or to stop this action entirely, without changing the oscillatory movement of the pawl, and to make the advancing movement of the ratchet, and therefore the feeding movement of bin conveyor 14, dependent upon the quantity of vines in the area between the cylinder 8 and the distributor 9, a shroud 73 is provided to overlie and cover a portion of the teeth of the ratchet with the position of the shroud relative to the path of pawl movement being governed by the vertical position of the feed cylinder. Shroud 73 is carried between a disk 74, mounted on shaft 18 behind the ratchet, and a bridge plate 75, which is on the opposite side of the ratchet and pinned to the disk by pins 76. Rotative movement of the disk will change the position of the shroud relative to the teeth of the ratchet. Thus, if the shroud is moved in a counterclockwise direction, as viewed in FIGURE 4, it will cover a portion of the arc of teeth of the ratchet normally traversed by pawl 66 and, therefore, will lift the pawl out of action for a portion of its stroke and thus reduce the effective action of the pawl. If the shroud is advanced far enough, it will underlie the entire pawl path and hold the pawl out of action so that the bin conveyor will stop. Rotative movement of the disk and the shroud is controlled by means of a link 77 connected to the disk and to the forward end of one of the lever arms 22. This will cause the shroud to move to reduce the ratchet advance whenever the cylinder moves downwardly and in direct ratio to the amount of downward movement. The shroud will retreat to uncover more of the ratchet teeth as the cylinder rises.

Vines in constant quantity will be deposited by the cylinder upon the discharge conveyor 10. This conveyor is supported upon inclined frame members 78 which are connected to and suitably braced from the other parts of the frame. The conveyor is an endless belt 79 passing around a shaft 80 mounted in the frame 78, at a point beneath the feed cylinder, and a shaft 81 at the top of frame 78. The conveyor will empty into an appropriate chute 82 for delivery to the machine being fed with vines.

A pick-up conveyor 83 overlies a portion of the bottom end of conveyor belt 79 and underlies the gap between the end of the bin conveyor 14 and the feed cylinder. Thus, any vines missed by the fingers 34 and dropping from the end of conveyor 14 will fall upon the pick-up conveyor and be carried to the conveyor belt 79. The pick-up conveyor may be suspended from the frame members 2 in any desirable manner.

It is contemplated that the machine will not include a power plant, but will receive its power from the machine it is to feed. Therefore, a chain 84 leading from a convenient sprocket on the machine being fed (not shown) is carried over a sprocket 85 on a stub shaft 86 mounted on the feeder frame. Shaft 86 carries a pinion gear 87 which is in mesh with a gear 88 carried by shaft 71. Shaft 71 extends completely across the machine, and carries the crank arm 70 on the opposite side. On the same side of the machine with the crank 70, shaft 71 carries a sprocket 89 for the distributor crankshaft operating chain 90, and a sprocket 91 which provides means to drive the feed cylinder. Chain 90 passes around a sprocket 92 on the crankshaft 44 and over a tightener sprocket 93 adjustably suspended from the top frame member 5. A chain 94 passes around the sprocket 91 and a sprocket 95 on a stub shaft 96 which also carries a sprocket 97. Another chain 98 passes over the sprocket 97 and the feed cylinder sprocket 27 to drive the cylinder. Also mounted on the shaft 71 on the end carrying the crank is a sprocket 99 for chain 100 which drives the delivery and pick-up conveyors. Chain 100 passes around a sprocket 101 on shaft 102 of pick-up conveyor 83 and around sprocket 103 on shaft 81 of the delivery conveyor. A chain tightener 104 for chain 96 is adjustably attached to the frame 78.

In operation, the feeder is positioned so that its delivery chute 82 is over the intake end of the machine to be fed.

Chain 84 is connected from a sprocket on a suitable drive shaft of the machine to be fed to the sprocket 85 on shaft 86. The machine is then ready for use. Vines will be dumped into bin 7 and carried over the floor of the bin to the feed cylinder. These vines will pile up adjacent the cylinder and the cylinder fingers 34, which will be outwardly projected as they rise in front of the end of the bin conveyor due to the actuating arms riding on the cams 36, will engage and pick up vines and carry them around the cylinder. As the vines pass over the top of the cylinder and start down the rear side, the actuating arms controlling the fingers will move off of the cams 36 so that the fingers may drop back and disengage the vines to allow them to fall free onto the discharge conveyor 10. In the event the fingers do not move toward the cylinder surface when released, the inclined extensions 41 of the actuating arms 35 will engage cams 37 and forceably withdraw the arms.

While the vines are being carried around the cylinder, the distributors will be active to level off the vine blanket passing around the cylinder and push back excess vines into the bin. The rotary motion of the crankshaft 44 and the fact that the distributor bars 42 and the control members 59 are pivotally connected to opposite ends of the rocker arms 46 will result in the distributor legs 43 following a cyclic movement which consist of lifting, moving and tilting their lower ends forwardly. This will cause the legs to move rearwardly over the vine blanket and then lower and kick the vines toward the bin. At the same time the distributor will re-arrange the vines to provide a uniform blanket on the cylinder. The offsetting of the crank throws will place only part of the legs in action at a time, therefore reducing the power required and maintaining continuous distributing action.

In the event the vines tend to pack over the cylinder, or to pile up faster than the distributors can level them off, the increased weight of vines will overcome the counterweight and the cylinder will move downwardly. This will cause the link 77 to rotate disk 74 and move shroud 73 toward the arc of ratchet 65 over which pawl 66 moves to cover a portion of the teeth of the ratchet in that arc and limit the advancing movement of the ratchet. Thus, the speed of the bin conveyor will be reduced in direct accordance with the excess quantity of vines on the cylinder. If the quantity is sufficient the conveyor will be stopped. This will allow time for the distributors to remove the excess and the cylinder to feed the accumulated vines. When the vine blanket on the cylinder lightens, the cylinder will rise and full feeding motion of the bin conveyor will be resumed. It will be clear that this arrangement will result in a uniform deposit of vines on the delivery conveyor and uniform feed to the processing machine.

While in the above one practical embodiment of the invention has been disclosed, it will be understood that the details of construction shown and described are merely by way of illustration, and the invention may take other forms within the scope of the appended claims.

What is claimed is:

1. A vine feeding machine comprising, a frame, a delivery conveyor mounted on the frame, a discharge conveyor mounted on the frame, a feed cylinder having an unbroken cylindrical surface rotatably mounted on the frame intermediate the delivery and discharge conveyors to pick up vines from the delivery conveyor and transfer them to the discharge conveyor, the cylinder being mounted for vertical floating movement and counterbalanced to occupy a predetermined vertical position within the frame under a predetermined vine load, a plurality of shafts spaced equidistant from one another around the cylinder with the shafts extending longitudinally of the cylinder and mounted for rocking movement about their axes, a plurality of vine-engaging fingers on each shaft with the fingers spaced apart longitudinally of the shaft, whereby the fingers may project generally radially outward of the cylinder and lie close to the cylindrical surface when the shafts are rocked to two positions, a cam mounted concentrically to the cylinder at one end of the cylinder for bodily movement with the cylinder and held against rotation, actuating arms at the ends of the shafts for cooperative engagement with the cam to move the shaft to position the fingers in their outwardly projected position, the cam being oriented relative to the cylinder to hold the teeth projected over an arc of cylinder rotation sufficient to lift vines from the delivery means and carry them to the top of the cylinder, a ratchet and pawl drive connected to the delivery conveyor for advancing the delivery conveyor, means for oscillating the pawl over a predetermined arc of the ratchet, means movable intermediate the ratchet and pawl to occlude a selected portion of the ratchet surface within the arc of pawl oscillation, and means intercoupling the cylinder and the ratchet occluding means so that the occluding means will move into the arc of pawl oscillation as the cylinder moves vertically downward.

2. A vine feeding machine as claimed in claim 1 wherein there are means to vary the arc of pawl oscillation.

3. A vine feeding machine as claimed in claim 1 wherein there is a second cam positioned in the arc of cylinder rotation unoccupied by the first cam and mounted concentrically to the cylinder for bodily movement with the cylinder and held against rotation, the second cam being engageable by the actuating arms to rock the shafts to move the fingers toward the cylindrical surface and retract the fingers from the vines.

4. A vine feeding machine as claimed in claim 3 wherein there is a duplicate cam and second cam on the opposite end of the cylinder and the actuating arms are connected to opposite ends of alternate shafts.

5. A vine feeding machine as claimed in claim 1 wherein there are a plurality of distributor units mounted above the cylinder, each unit comprising a distributor bar mounted on the frame for vertical swinging and horizontal oscillation longitudinally of the machine and a plurality of distributor legs pivotally connected to the distributor bar for swinging in a vertical plane, a crankshaft mounted on the frame and having a crank throw connected to each distributor bar to cause the bars to swing vertically and oscillate horizontally and a control member coupled to the distributor legs of each distributor bar and to the frame to cause the legs to swing relative to the distributor bar as the bar is oscillated through rotation of the crankshaft.

6. A vine feeder as claimed in claim 5 wherein there is means to adjust the vertical position of the distributor units relative to the feed cylinder.

7. In a vine feeding machine having a frame, a feed cylinder mounted in the frame for bodily movement vertically of the frame and counterbalanced to occupy a predetermined vertical position within the frame under a predetermined vine load, means to rotate the cylinder, means to deliver vines to the cylinder, and means to carry vines from the cylinder for discharge from the machine, the improvement which comprises, said cylinder having an unbroken surface, a plurality of shafts spaced equidistant from one another around the cylindrical surface with the shafts extending longitudinally of the cylinder and mounted for rocking movement about their own axes, a plurality of vine-engaging fingers on each shaft with the fingers spaced apart longitudinally of the shaft, whereby the fingers may project generally radially outward of the cylinder and lie close to the cylindrical surface when the shafts are rocked to two positions, a cam mounted concentrically to the cylinder at one end of cylinder for bodily movement with the cylinder and held against rotation, actuating arms at the ends of the shafts for cooperative engagement with the cam to move the shaft to position the fingers in their outwardly projected position, the cam being oriented relative to the cylinder to hold the teeth projected over an arc of cylinder rotation sufficient to lift vines from the delivery means and carry them to the top of the cylinder.

8. A vine feeding machine as claimed in claim 7 wherein there is a second cam positioned in the arc of cylinder rotation unoccupied by the first cam and mounted concentrically to the cylinder for bodily movement with the cylinder and held against rotation, the second cam being engageable by the actuating arms to rock the shafts to move the fingers toward the cylindrical surface and retract the fingers from the vines.

9. A vine feeding machine as claimed in claim 8 wherein there is a duplicate cam and second cam on the opposite end of the cylinder and the actuating arms are connected to opposite ends of alternate shafts.

10. In a vine feeding machine having a frame, a feed cylinder mounted in the frame for bodily movement vertically of the frame and counterbalanced to occupy a predetermined vertical position within the frame under a predetermined vine load, means to rotate the cylinder, means to deliver vines to the cylinder, and means to carry vines from the cylinder for discharge from the machine, the improvement which comprises, a plurality of distributor units mounted above the cylinder, each unit comprising a distributor bar mounted on the frame for vertical swinging and horizontal oscillation longitudinally of the machine and a plurality of distributor legs pivotally connected to the distributor bar for swinging in a vertical plane, a crankshaft mounted on the frame and having a crank throw connected to each distributor bar to cause the bars to swing vertically and oscillate horizontally and a control member coupled to the distributor legs of each distributor bar and to the frame to cause the legs to swing relative to the distributor bar as the bar is oscillated through rotation of the crankshaft.

11. In a vine feeding machine having a frame, a feed cylinder mounted in the frame for bodily movement vertically of the frame and counterbalanced to occupy a predetermined vertical position within the frame under a predetermined vine load, means to rotate the cylinder, means to deliver vines to the cylinder, and means to carry vines from the cylinder for discharge from the machine, the improvement which comprises, a plurality of distributor units mounted above the cylinder, each unit comprising a rocker arm pivoted intermediate its ends to the frame, a distributor bar pivotally connected at one end to one end of the rocker arm, a plurality of distributor legs pivotally connected intermediate their lengths to the bar, a control member coupled between the opposite end of the rocker arm and the top ends of the distributor legs, and a crankshaft rotatably mounted on the frame and having a plurality of crank throws with one distributor bar being journalled to each crank throw.

12. A vine feeder as claimed in claim 11 wherein there is means to adjust the vertical position of the distributor units relative to the feed cylinder.

References Cited in the file of this patent
UNITED STATES PATENTS

| | | |
|---|---|---|
| 2,649,951 | Sandburg | Aug. 25, 1953 |
| 2,797,795 | West | July 2, 1957 |
| 2,842,255 | Jarrell | July 8, 1958 |